UNITED STATES PATENT OFFICE.

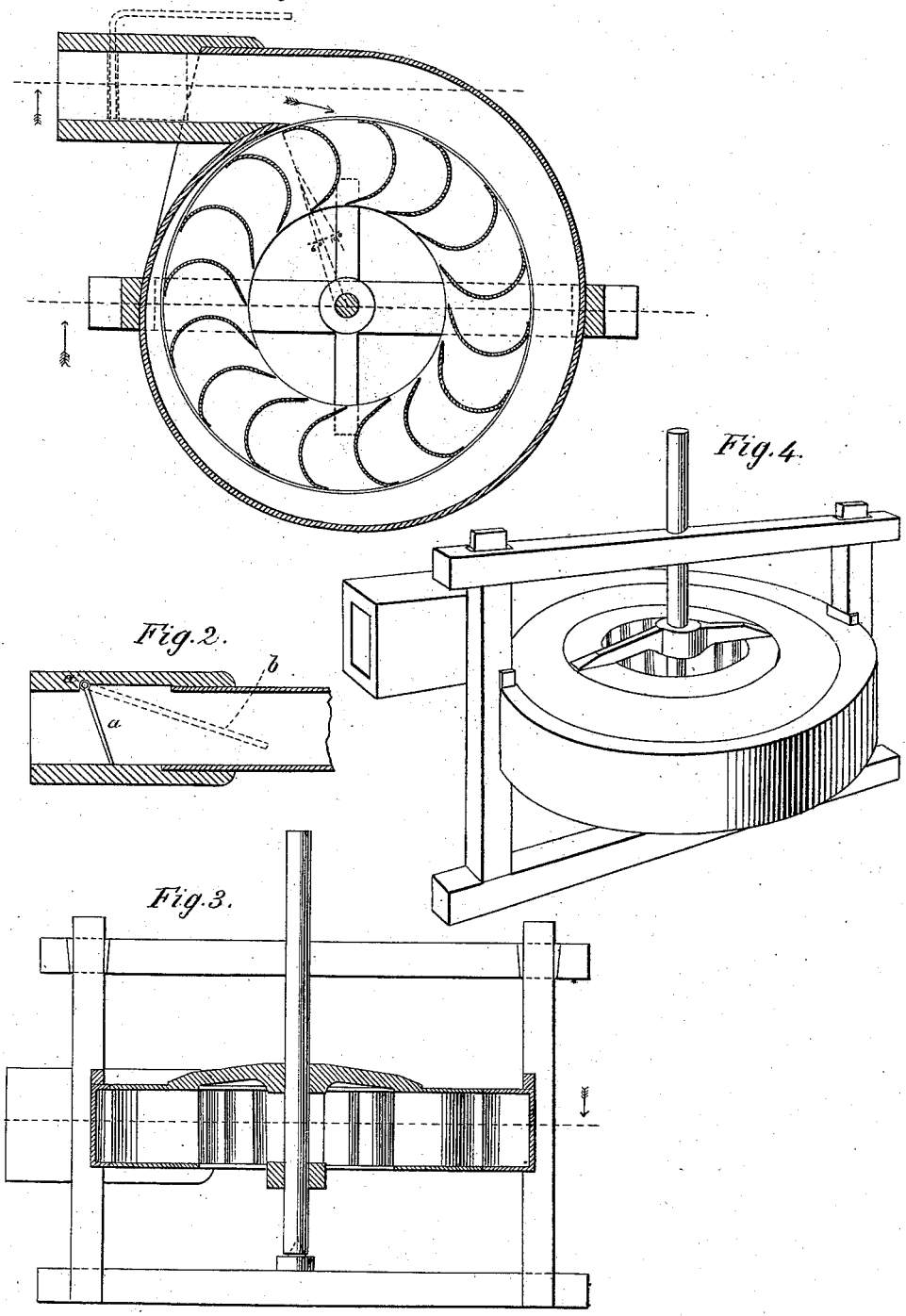

LORENZO D. GOODWIN, OF PERUVILLE, NEW YORK.

IMPROVEMENT IN WATER-WHEELS.

Specification forming part of Letters Patent No. 10,729, dated April 4, 1854.

*To all whom it may concern:*

Be it known that I, LORENZO D. GOODWIN, of Peruville, in the county of Tompkins and State of New York, have invented certain new and useful Improvements in Water-Wheels with Center Vent; and I do hereby declare that the following is a full, clear, and exact description thereof, reference being had to the accompanying drawings, in which—

Figure 1 is a horizontal section; Fig. 2, a vertical section of the flume, showing the balance regulating-gate; Fig. 3, a vertical section of the wheel; Fig. 4, a perspective view.

My improvement consists in the peculiar form given to the buckets and the balance-gate for regulating the admission of water, which acts as a perfect regulator to the wheel, supplying it with water according to the load upon it, as required.

The construction is as follows: I form a head and sole of annular form, upon which the buckets are affixed perpendicularly. The buckets are from sixteen to thirty in number, more or less, according to circumstances, the size of the wheel, &c. When the outer points of the buckets are laid off, a compass is set to one-half of the breadth of the rim, so as to commence the curve of a segment of a circle at a tangent to the periphery of the wheel, curving inward and forming the curve of the bucket. This curve continues around one hundred and seventy degrees, and from thence it continues in a straight line fifteen degrees farther until it strikes the inner curve to which it is a tangent, projecting about five degrees beyond a radial line that touches the outer point of the bucket, as shown by the radial lines drawn upon the wheel at one of the buckets in red. I have found by the most careful and extended experiments that this is the best form for the buckets of a center-vent wheel, and that all substantial deviation therefrom injures the effect. The object I have in view is to let the water onto the wheel with the least possible shock, the bucket commencing at a tangent and letting it off in the same way, as the bucket terminates with a straight tangent line to the point of discharge, delivering the water nearly in a state of rest, which does not create a whirl even at the center. The wheel thus constructed runs within a scroll of ordinary form, the inlet to which is of double the capacity of the amount of water to be discharged. The effect of this peculiar construction of wheel, combined with the manner indicated for laying on the water is to discharge a greater amount of water, when the wheel is at rest than when it is in motion, and as the speed of the wheel increases the discharge decreases. Upon this fact, peculiar to the construction of my wheel, I base my improved regulator. Within the part leading to the forebay there is what I call a "balance regulator-gate" $a$. It is hinged to the top at $d$, where a shaft runs through the side, to which a lever $b$ is affixed that serves to moves the gate. This gate $a$ opens with the current through it in the direction of the current, and when opened to the proper point for the labor required it is held in that position by a proper weight upon the lever $b$, which acts to close the gate, and if any labor is removed from the wheel or more is added the gate rises and falls by the action of the current thereon to admit more or less water, as required, rendering it a perfectly self-regulating apparatus, which by practice I have found to be more perfect and immediate in its action than any other I have before seen.

Having thus fully described my improved wheel and its regulator-gate, what I claim therein as new, and desire to secure by Letters Patent, is—

1. The form and proportions of the buckets, as specifically set forth, commencing in a true circle at a tangent to the outer periphery and terminating in a straight line fifteen degrees in length at the inner curve and at a tangent thereto, as herein fully explained.

2. The self-regulating gate to the scroll, constructed and arranged in the manner and for the purpose set forth.

L. D. GOODWIN.

Witnesses:
 THOS. E. WARREN,
 J. J. GREENOUGH.